United States Patent [19]

Fattal

[11] Patent Number: 5,065,956
[45] Date of Patent: Nov. 19, 1991

[54] METHOD FOR DETECTING CHANGES IN SPIN RATE OF A MISSILE IN FLIGHT

[75] Inventor: Jean A. Fattal, Lexington, Mass.

[73] Assignee: Raytheon Compnay, Lexington, Mass.

[21] Appl. No.: 389,475

[22] Filed: Aug. 3, 1989

[51] Int. Cl.⁵ ............................................... F14G 7/00
[52] U.S. Cl. ..................................... 244/3.2; 244/3.21
[58] Field of Search ....................... 244/3.2, 3.21, 3.15, 244/3.23; 318/254

[56] References Cited

U.S. PATENT DOCUMENTS

| | | | |
|---|---|---|---|
| 3,824,455 | 7/1974 | Levitt et al. | 324/34 |
| 4,192,189 | 3/1980 | Presley | 73/505 |
| 4,536,685 | 8/1985 | Fattal et al. | 318/254 |
| 4,676,456 | 6/1987 | Grosso et al. | 244/3.21 |
| 4,790,493 | 12/1988 | Schwarzkopf et al. | 244/3.21 |

FOREIGN PATENT DOCUMENTS 2041678  9/1980  United Kingdom.

*Primary Examiner*—Mark Hellner
*Attorney, Agent, or Firm*—Donald F. Mofford; Richard M. Sharkansky

[57] ABSTRACT

A method of determining the difference between the actual rotational speed of the body of a guided missile and a nominal rotational speed is shown to consist of the steps of comparing a shaped output of a Hall effect cell with a shaped output of an oscillator and deriving a signal indicative of any difference between the periods of the shaped outputs.

9 Claims, 3 Drawing Sheets

METHOD FOR DETECTING CHANGES IN SPIN RATE OF A MISSILE IN FLIGHT

This invention was made with Government support under Contract DAAK10-80-C-0066 awarded by the Department of the Army. The Government has certain rights in this invention.

BACKGROUND OF THE INVENTION

This invention pertains generally to guided missiles incorporating gyroscopically stabilized elements, and particularly to arrangements for sensing the body spin rate of any such type of missile.

It is known in the art, as shown in U.S. Pat. No. 4,536,685 (which patent, assigned to the same assignee as this application, is incorporated herein by reference), that the gimbals of a gyroscopically stabilized antenna in a guided missile (hereinafter referred to simply as a missile) may be precisely controlled. Thus, as shown in the just-cited patent, a pair of phase-locked control loops may be operated in tandem in response to signals from Hall effect crystals to synchronize an electric motor driving a gyroscope to an externally generated clock signal. As a result, then, the orientation of a gyroscopically stabilized platform on which an antenna is mounted may be precisely determined.

It is highly desirable, if not essential, that the spin rate of the body of the missile also be determined. Unfortunately, as disclosed in the cited reference, there is no apparent way in which the teaching of the cited reference may be used to determine the spin rate of the body of a missile. It follows, then, that other known devices, such as accelerometers and associated circuitry, may be used to determine the desired spin rate. However, any known device and required signal processing circuitry are expensive and difficult to implement in the confines of a missile.

SUMMARY OF THE INVENTION

With the foregoing background of the art in mind, it is a primary object of this invention to provide, as a portion of the guidance system in a missile, a method of processing signals from Hall effect crystals to determine the spin rate of the body of a missile.

Another object of this invention is to provide a method of attaining the primary object of this invention using elements in a guidance system that are also used to effect stabilization of a seeker within the body of a missile.

The foregoing and other objects of this invention are attained generally by comparing reference signals with signals produced by one of the Hall effect crystals effecting stabilization of a seeker within the body of a missile so as to produce signals indicative of the spin rate of the body of a missile.

BRIEF DESCRIPTION OF THE DRAWINGS

For a more complete understanding of this invention reference is now made to the following description of the accompanying drawings wherein.

DESCRIPTION OF THE PREFERRED EMBODIMENTS

Before referring to the FIGURES in detail it should first be noted that angular position sensors using Hall effect crystals are shown in U.S. Pat. No. 3,824,455. Because such crystals may be used in practicing the present method, the just-cited patent is incorporated by reference herein (along with U.S. Pat. No. 4,536,685) to show that the present method encompasses the idea of using signals from known position-detecting arrangements. In connection with the foregoing it will be observed that elements described in either U.S. Pat. No. 3,824,455 or U.S. Pat. No. 4,536,685 are shown in broken lines in FIG. 1.

Figure 2A:
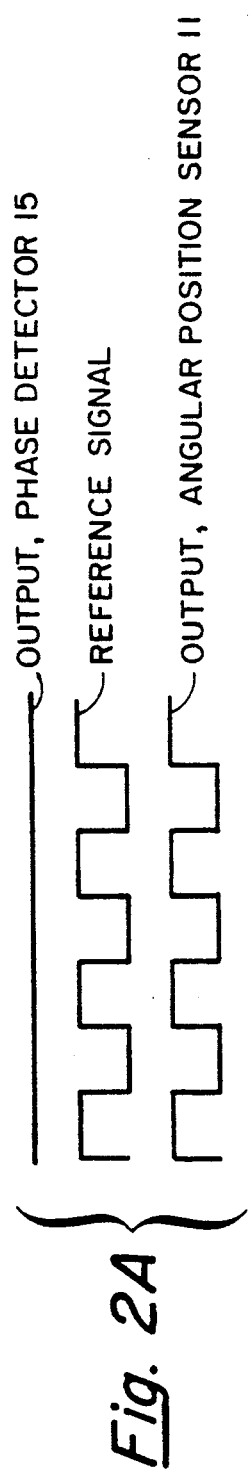
FIGS. 2A, 2B and 2C show typical waveforms of the signals useful in an understanding of this invention.
Figure 2B:
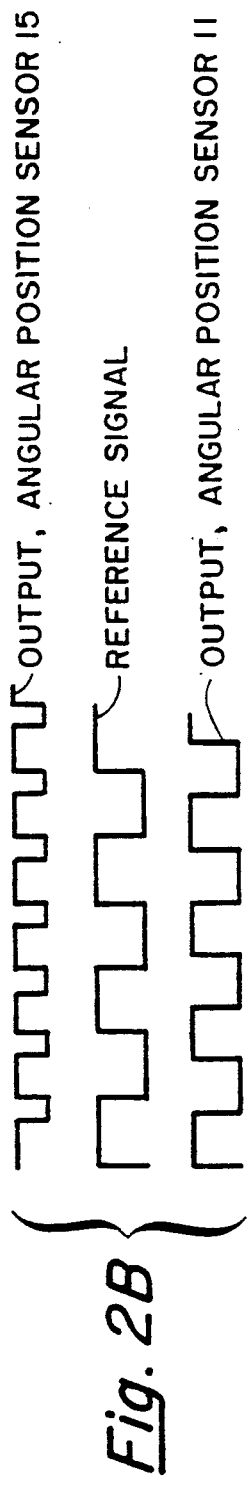
Figure 2C:
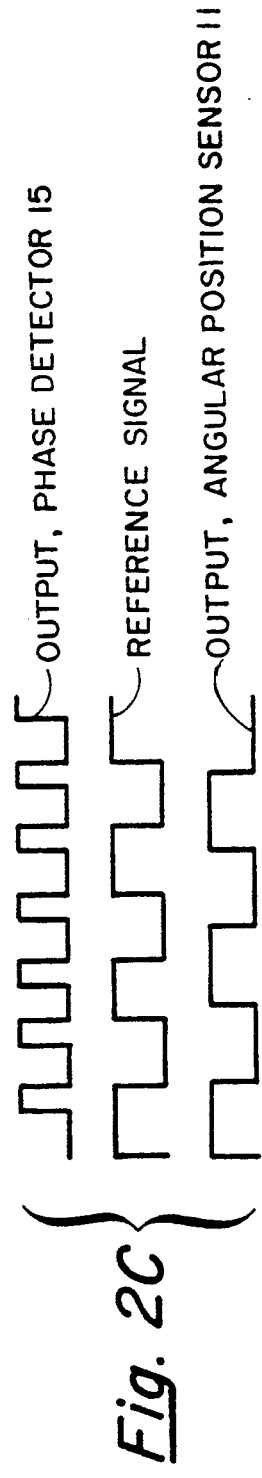

With the foregoing in mind it may be seen that an angular position sensor 11 is arranged to produce signals for a phase lock loop and filter 13 and a phase detector 15. It will be appreciated that the angular position sensor 11 corresponds with the Hall effect sensors and squarer shown in U.S. Pat. No. 4,536,685 to produce square waves (one of which is shown in FIGS. 2A, 2B and 2C). The phase lock loop and filter 13 includes a voltage-controlled oscillator and filter (not shown here but described and shown in U.S. Pat. No. 4,536,685) to produce a D.C. signal approximately representative of the rotational position of the rotor (not shown) of a gyroscope 17. The phase detector 15 is responsive to the output of the angular position sensor 11 and to a reference signal to produce a signal (such as shown in FIG. 2A, 2B or 2C) that, after being passed through a filter 19 (here a low pass filter), is applied as a second input to a controller 21 along with the signal out of the phase lock loop and filter 13. The reference signal is formed by appropriately shaping the sinusoidal output of an oscillator (not shown) in any known manner. The oscillator, of course, has an output with a fixed predetermined period. As described in U.S. Pat. No. 4,536,685, the just described combination of elements is effective ultimately to synchronize the rotating magnetic field actuating the Hall effect crystals with the reference signal to determine the orientation of a gyroscopically stabilized platform.

To accomplish the results here contemplated, the output of an interface unit 20 and the output of the filter 19 are passed to an analog-to-digital converter, A/D converter matrix 23. It will be appreciated that the positional information contained in the signals out of the phase detector 15 is the same as the positional information contained in the signals out of the filter 19. However, The signals differ in format in that the signal out of the phase detector 15 is, in the presence of a change in the spin rate of the body of the missile (not shown), a time varying signal and the signal out of the filter 19 is a D.C. signal. It follows, then, that the A/D converter matrix 23 may be arranged to be responsive to either the time varying signal out of the interface unit 20 or to the D.C. signal out of the filter 19.

The selected signals out of the A/D converter matrix 23 are passed to a processor 25 wherein control signals for an autopilot 27 of conventional construction are derived. The autopilot 27 then produces command signals for the control surfaces (not shown) of the missile (not shown).

Figure 3:
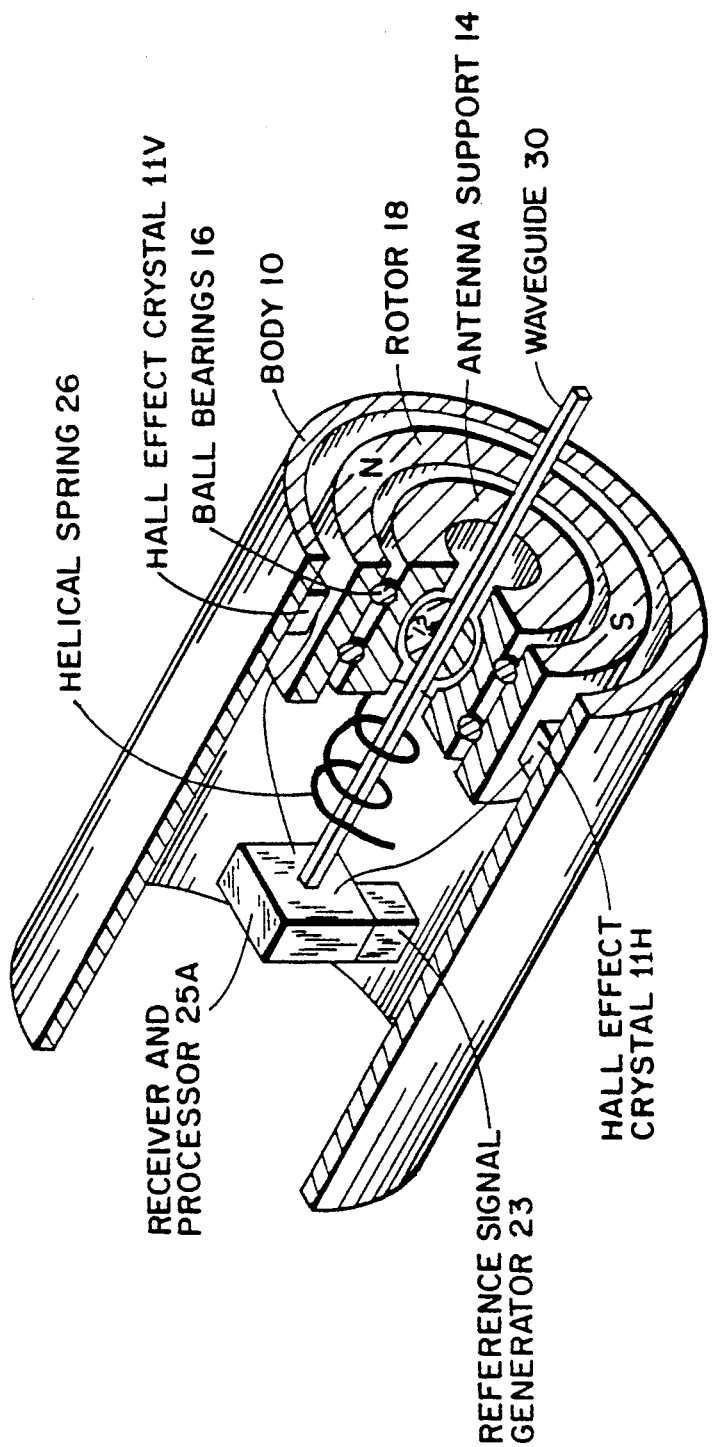
FIG. 3 is a sketch showing the general arrangement of elements in a missile whereby waveforms of FIGS. 2A, 2B and 2C are derived.

It may be seen in FIG. 3 that the gyroscopically controlled platform (not numbered) here contemplated is similar to the gyroscopically controlled platform shown in U.S. Pat. No. 4,536,685. Thus, a spherical bearing 12 is supported in any convenient manner centrally of the body 10 of a missile (not numbered). For example, a helical spring 26 is connected as shown between the antenna support 14 and the body 10. An antenna support 14, mounted as shown on the spherical bearing 12, is also a support for ball bearings 16. A rotor 18 is mounted on the ball bearings 16. The rotor 18 is here shown as a magnet magnetized as indicated by letters N and S. The rotor 18 is adapted to interact with appropriate coils (not shown) affixed to the body 10 so as to rotate. It is evident now that: (a) the rotor 18 is a gyroscopic mass that is effective to stabilize an antenna (not shown) attached to the antenna support 14; and (b) the antenna support 14 is movable on the spherical bearing 12 so that the field of view of an antenna (not shown) on the antenna support 14 may be changed within rather broad limits.

Hall effect crystals 11H, 11V are mounted on the body 12 to interact with the rotating magnets in the rotor 18. The outputs of the Hall effect crystals 11H, 11V are passed over appropriate wires to a receiver and processor 25A (which processor contains the processing elements shown in FIG. 1) along with reference signals from a reference signal generator 23 and received signals out of a waveguide 30.

It will now be obvious that, with the rotational speed of the rotor 18 constant: (a) any change in the output of a selected one of the Hall effect crystal 11H, 11V is due to a change in the rotational speed of the body 10 of the missile; and (b) any change in the rotational speed of the rotor 18 is nulled in the manner hereinbefore explained. That is to say, the output of a selected Hall effect cyrstal 11H, 11V is (after shaping) compared with a reference signal to produce a control signal that counteracts any changes in the rotational speed of the rotor 18 as described in connection with FIG. 1.

Figure 1:
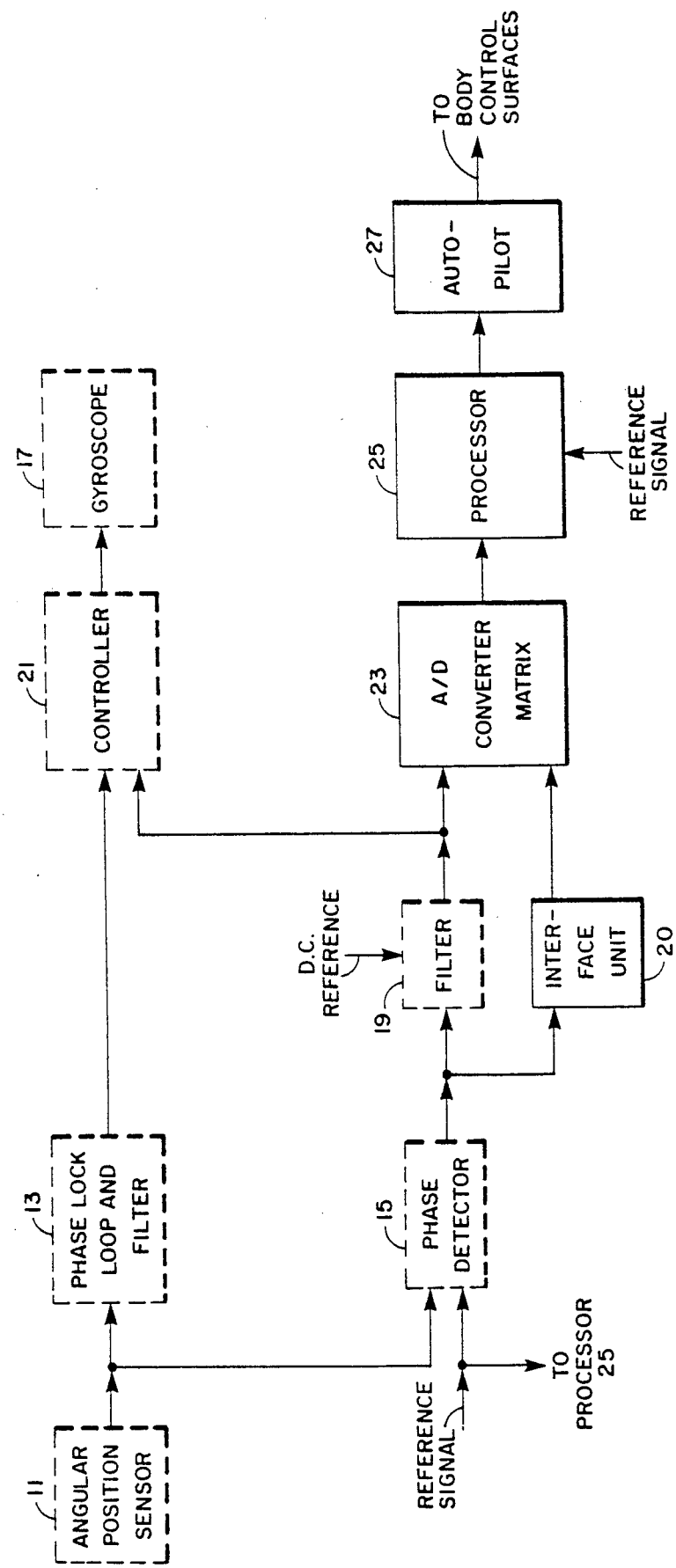
FIG. 1 is a block diagram showing how body spin rate signals may be derived according to this invention.

With the foregoing in mind, it may be seen in FIG. 2A that, when the rotor 18 and the body 10 of the missile each is rotating at a different, but constant, angular speed, the shaped output of the selected Hall effect crystal 11H, 11V is in phase with the reference signal. It follows that the output of the phase detector 15 (FIG. 1) is a time invariant signal as shown in FIG. 2A. If the rotational speed of only the body 10 of the missile increases, the period of each revolution of the body 10 of the missile decreases. As a result, the shaped output of the selected Hall effect crystal 11H, 11V is not synchronous with the reference signal. Consequently, the output of the phase detector 15 (FIG. 1) changes from a time invariant signal to a pulsed signal as shown in FIG. 2B. In like manner, if the rotational speed of only the body 10 decreases, the period of each revolution of the body 10 increases with the ultimate result being that a pulsed signal as shown in FIG. 2C is produced by the phase detector 15 (FIG. 1). It should be noted that: (a) the polarity of the pulsed signal out of the phase detector 15 (FIG. 1) is indicative of the direction of the change in the rotational speed of the body 10; and (b) the length of each pulsed signal is indicative of the difference between the actual rotational speed of the body 10 and a nominal rotational speed of the body 10.

It will be obvious to one of skill in the art that any one of many different processing techniques may be used in the processor 25 (FIG. 1) to produce signals indicative of spin rate of the body of a missile. For example, the processor 25 may contain: (a) conventional logic circuitry responsive to selected transistions of the reference signal and the signal out of the phase detector 15 (FIG. 1) to produce a first signal indicative of the direction of the change in the rotational speed of the body 10 (FIG. 1); and (b) conventional elements (such as a counter with a gated input) to produce a second signal indicative of the magnitude of the difference between the actual rotational speed of the body 10 (FIG. 1) and a nominal rotational speed. The first and the second so produced signals then may be applied to the autopilot 27 (FIG. 1) if it is desired to null any change in the rotational speed of the body 10 (FIG. 1). Alternatively, if the output of the filter 19 (FIG. 1) is selected for processing, the processor 25 may be arranged to compare the level of that output to the level of a reference signal thereby to produce a signal indicative of the difference between the actual rotational speed of the body 10 (FIG. 1) and a nominal rotational speed.

In a guided missile wherein a Hall effect crystal is disposed to sense the orientation of a gimbal associated with a gyroscopically stabilized platform, the method of sensing changes in the rotational speed of the body of such missile, such method comprising the steps of: (a) deriving a first signal having a period inversely proportional to the actual angular velocity of the body and forming a second signal having an invariant period; (b) applying the first and the second signal to a phase detector to derive a third signal indicative of any difference in timing between the first and the second signal; and (c) converting the third signal to a fourth signal indicative of the difference between the actual rotational speed of the body and a nominal speed represented by the second signal.

It will now be apparent to one of skill in the art, so long as the signals into the processor shown in FIG. 1 are indicative of the rotational speed of the body of a missile, the details of such processor may be changed in any known manner to accommodate the format of the signals to be processed. Thus, it will be apparent that signals out of the filter in FIG. 1 (which signals are D.C. signals corresponding to the integral of the signals out of the phase detector of FIG. 1) may be substituted for signals out of the interface unit of FIG. 1). It is felt, therefore, that this invention should not be restricted to its disclosed embodiment but rather should be limited only by the spirit and scope of the appended claims.

What is claimed is:

1. A method for minimizing changes in the rotational speed of a body of a missile comprising the steps of:
   (a) deriving a first signal indicative of actual angular velocity of the body of the missile and providing a second signal having an invariant period;
   (b) applying the first and the second signal to a phase detector to derive a third signal indicative of any difference in timing between the first and the second signal;
   (c) converting the third signal to a fourth signal indicative of the difference between the actual rotational speed of the body and a nominal speed represented by the second signal; and
   (d) providing, in response to the fourth signal, a signal indicative of the direction and the magnitude of change required in the rotational speed of the body of the missile.

2. The method as in claim 1 with the additional step of integrating the third signal before conversion of such signal to the fourth signal.

3. The method as in claim 1 wherein the first signal is a square wave derived from the output of a Hall effect cell, such square wave having a period inversely proportional to the actual angular velocity of the body of the guided missile and the second signal is a square wave having an invariant period.

4. The method as recited in claim 1 further comprising the step of providing the signal indicative of the direction and the magnitude of change required in the rotational speed of the body of the missile to an autopilot to effectuate said change.

5. A method of operating a flight vehicle comprising the steps of:
   (a) providing a relative angular position signal indicative of a difference between a rotational speed of a body of a missile and a rotational speed of a rotor disposed within the body of the missile;
   (b) providing a reference signal indicative of a desired rotational speed of the rotor;
   (c) providing, in response to the relative angular position signal and the reference signal, a relative body angular position signal indicative of the difference between the actual rotational speed of the body of the missile and a desired rotational speed of the body of the missile; and
   (d) providing, in response to the relative body angular position signal, a signal indicative of the direction of change in the rotational speed of the body of the missile.

6. The method as recited in claim 5 further comprising the step of providing a signal indicative of the magnitude of change required of the rotational speed of body of missile.

7. The method as recited in claim 6 further comprising the step of providing the signal indicative of the direction of change and the signal indicative of the magnitude of change required of the rotational speed of the body of the missile to an autopilot.

8. A flight vehicle comprising:
   (a) means for providing a first signal indicative of rotational speed of a body of a missile;
   (b) means for providing a reference signal indicative of a desired rotational speed of the body of the missile;
   (c) means, in response to the first signal and the reference signal, for providing a second signal indicative of a difference between the rotational speed of the body of the missile and the desired rotational speed of the body of the missile; and
   (d) means, in response to the second signal, for providing a signal to an autopilot to minimize the difference between the rotational speed of the body of the missile and the desired rotational speed of the body of the missile.

9. The flight vehicle as recited in claim 8 wherein the means for providing a first signal comprises:
   (a) means for providing a relative angular position signal indicative of a difference between the rotational speed of the body of the missile and a rotational speed of a rotor disposed within the body of the missile; and
   (b) means, in response to the relative angular position signal and the reference signal, for providing the first signal.

* * * * *